Sept. 13, 1960 J. A. MAURER, JR 2,952,181

METHOD OF AND APPARATUS FOR AUTOMATIC IDENTIFICATION OF FINGER PRINTS

Filed Dec. 31, 1956 3 Sheets-Sheet 1

John Andrew Maurer Jr.
Inventor.

John Andrew Maurer, Jr.
Inventor.

Sept. 13, 1960 J. A. MAURER, JR 2,952,181

METHOD OF AND APPARATUS FOR AUTOMATIC IDENTIFICATION OF FINGER PRINTS

Filed Dec. 31, 1956 3 Sheets-Sheet 3

John Andrew Maurer Jr.
Inventor.

United States Patent Office 2,952,181

Patented Sept. 13, 1960

2,952,181

METHOD OF AND APPARATUS FOR AUTOMATIC IDENTIFICATION OF FINGER PRINTS

John Andrew Maurer, Jr., 320 W. 86th St., New York, N.Y.

Filed Dec. 31, 1956, Ser. No. 631,794

9 Claims. (Cl. 88—14)

This invention relates to the classification and identification of finger prints. More particularly, it relates to the identification of finger prints automatically by optical scanning and electrical analysis of the wave patterns resulting from such scanning.

The general object of the invention is to provide apparatus and a method by which an individual finger print may be scanned optically in such a manner that the procedure produces an arithmetical number uniquely related to the pattern of the finger print, this number consisting of a large enough number of digits to identify the print among the others in a large population.

When any pattern of light and dark lines is scanned by a moving light beam, the shape of the resulting wave of light intensity depends to a considerable extent on the position of the object that is scanned in relation to the scanning pattern.

A subsidiary object of the invention, therefore, is to provide means, and a method, by which a finger print may be positioned automatically in relation to the optical scanning system, in such a way that the position is unique and will be reestablished each time that the print is placed before the apparatus, thus insuring that a subsequent scanning operation will always produce the same electrical waves.

A second subsidiary object of the invention is to provide means for selectively scanning different areas of a finger print and for deriving from each part so scanned a single digit number directly related to the structure of the area in question.

Another subsidiary object is to provide an optical scanning system in which changes of the position of the projected optical axis and in which changes by rotation about the optical axis can be made and controlled by electrical and electronic equipment.

Another subsidiary object of the invention is to provide an optical scanning system by which a predetermined sequence of scanning operations can be performed rapidly and automatically.

A fifth subsidiary object of the invention is to provide types of scanning beams that are suited to reveal the individual characteristics of areas in finger print patterns.

A sixth subsidiary object of the invention is to provide photo-electric and electronic means by which the variations of light that result from scanning a finger print with suitably shaped light patterns may be made to control the positioning of the print with relation to the scanning optical system.

A seventh subsidiary object is to provide photo-electric, electrical, and electronic means by which the variations of light that result from scanning the various parts of a finger print may be translated into numerical information.

The nature of the invention and the manner of carrying it out may be better explained with reference to the accompanying drawing, in which Figure 1 is an approximate reproduction, by drawing instruments, of an actual finger print, with certain characteristic features indicated.

Figures 8, 9, 10, 11, 12:
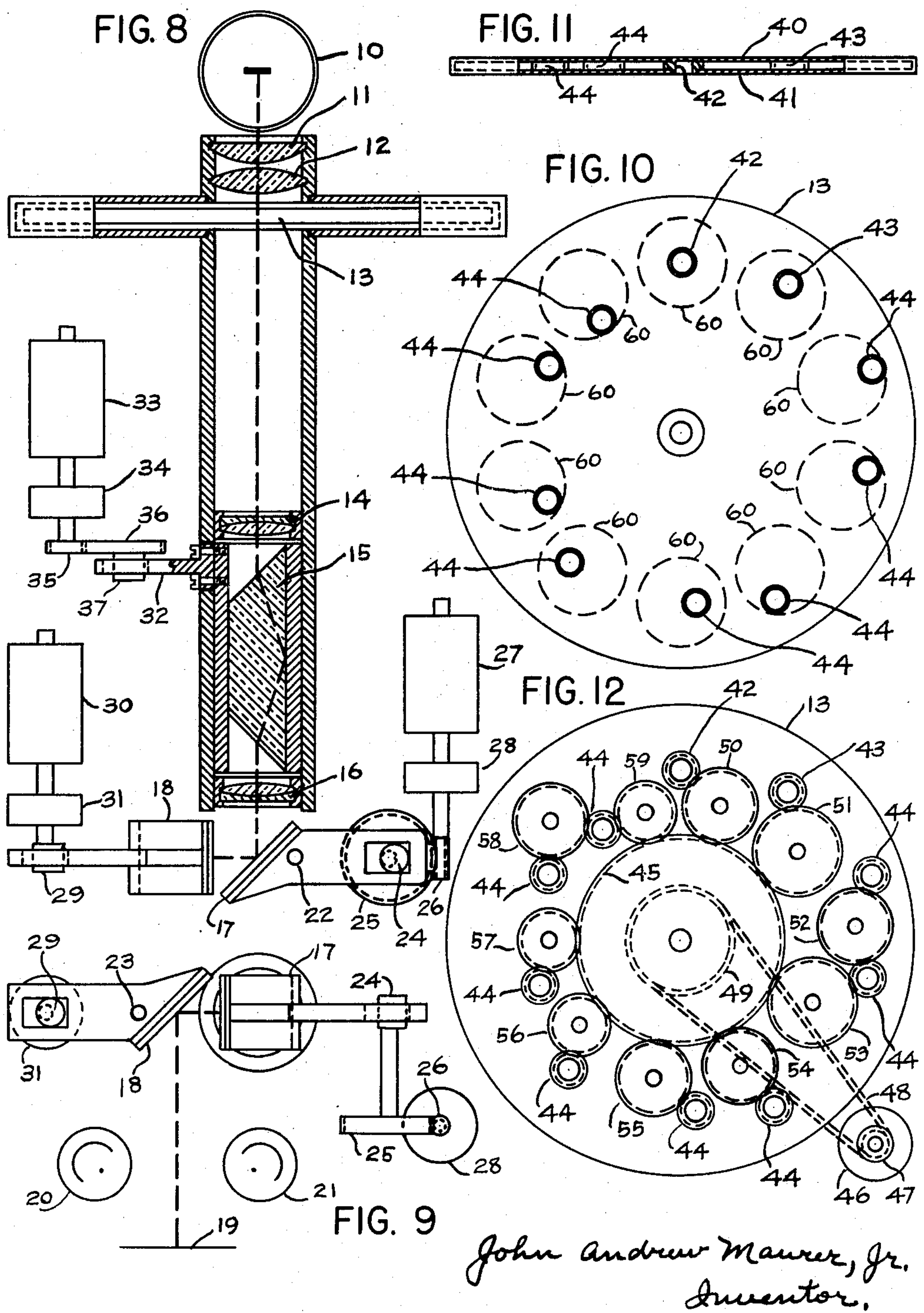
Figure 8 shows a view, looking downward, of an optical system used to project the scanning images on the finger print. The main barrel of the optical system is shown in section, the section being taken through the optical axis.

Figure 9 shows a view at right angles to the view shown in Figure 8, looking in the direction opposite to that in which the light travels in the main barrel of the optical system, showing more clearly than could be shown in Figure 8 alone the arrangement of two mirrors used to obtain a scanning movement of the light beam in rectangular coordinates. This figure also shows certain motors and clutches used to control its operation and shows the location of the finger print and the locations of two photo-electric cells which receive part of the light reflected from the finger print.

Figure 5:
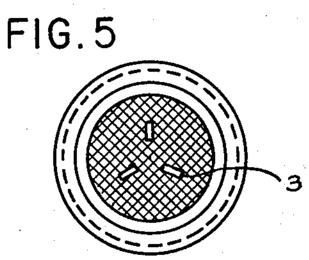
Figure 5 shows an enlarged view of a small gear carrying the aperture which, when projected, gives the scanning pattern shown in Figure 2.
Figure 6:
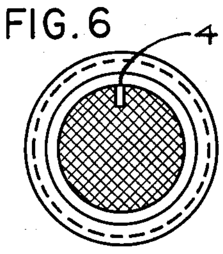
Figure 6 shows an enlarged view of a small gear carrying the aperture which, when projected, gives the scanning pattern shown in Figure 3.
Figure 7:
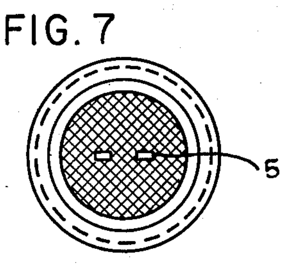
Figure 7 shows an enlarged view of a small gear carrying the aperture which, when projected, gives the scanning pattern shown in Figure 4.

Figure 10 shows a front view of a wheel carrying ten rotating apertures, of which one is of the type shown in Figure 5, one is of the type shown in Figure 6, and eight are of the type shown in Figure 7.

Figure 11 shows a top view of the wheel shown in Figure 10, for the purpose of showing how this wheel is constructed to mount the gears shown in Figures 5, 6, and 7.

Figure 12 shows a view of the internal construction of the wheel shown in Figures 10 and 11, for the purpose of showing how rotary movement is imparted to the small gears which carry the apertures.

Figure 13:
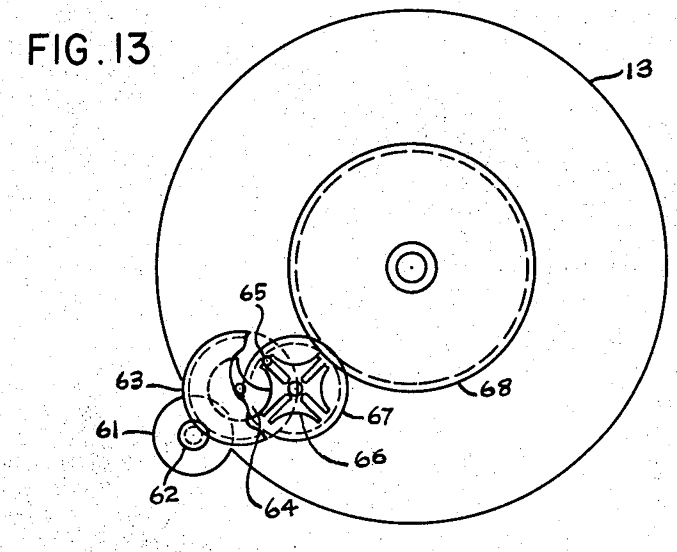

Figure 13 shows a mechanism of the well known Geneva type, used to impart an indexing motion to the wheel shown in Figures 10, 11, and 12.

Figure 14:
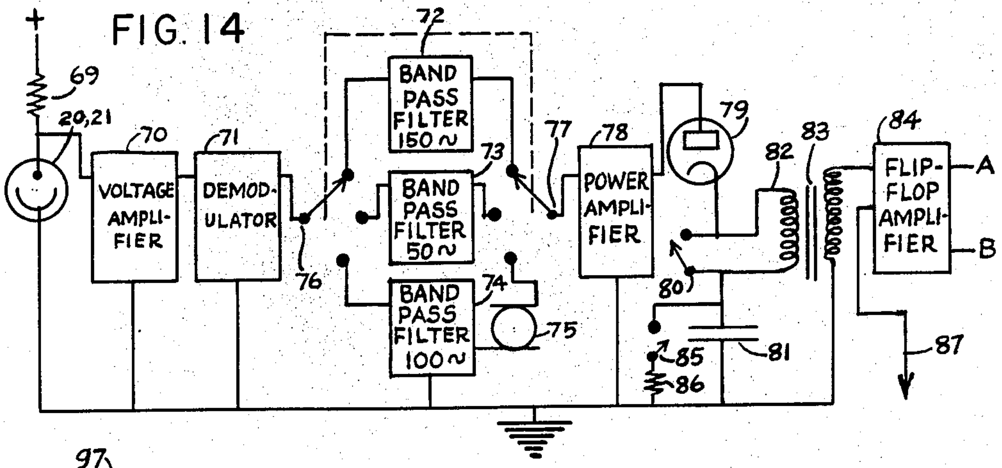

Figure 14 shows an electrical circuit, including amplifiers, a demodulator, filters, and a rectifier, used to amplify and respond to the variations of light picked up by the photo-electric cells shown in Figure 9.

Figure 15:
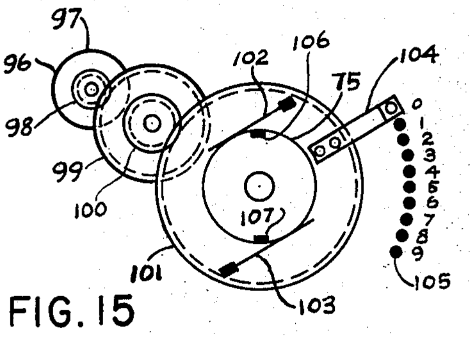

Figure 15 shows a commutating device used to translate the output of the amplifier shown in Figure 14 into numerical form.

Figure 16:
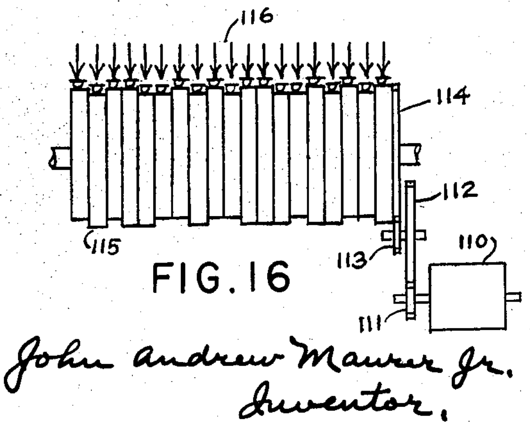

Figure 16 shows a sequencing switch used to control the series of operations involved in the scanning and identification of a finger print.

Figure 1:
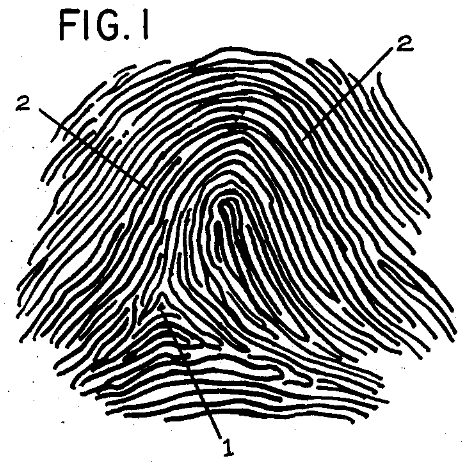

The diversity of patterns in finger prints is very great; nevertheless there are two features which occur so regularly that for the purposes of this invention they may be assumed to be present in all finger prints. The first of these is a triangular formation generally referred to as the "delta." This usually occurs nearer to the first knuckle of the finger than to the tip of the finger. The form shown in Figure 1 is typical. Sometimes there are two deltas in one print, one of which is larger than the other.

The second regularly occurring feature is a generally circular formation of the lines nearest the tip of the finger. This does not mean that there is a complete circle. Sometimes there is a closed oval, sometimes an arch with the outer lines diverging at the base; sometimes the part of the pattern that extends in the direction away from the tip of the finger is merely drawn out into a formation of more or less parallel lines, as shown in Figure 1. The important fact is that the lines near the tip of the finger lie in a pattern which approximates a group of arcs of concentric circles.

According to this invention, the process of scanning and identification of the finger print takes place in three steps. The first step consists in making the projected axis of the optical system pass through the center of the delta. The second step is one of rotational orientation; the vertical axis in the optical system (perpendicular to the optical axis), as projected, is made to coincide with the line determined by the center of the delta and the center of the system of circular arcs near the tip of the finger. These adjustments are made within the optical system. The finger print itself remains in a fixed position.

The third step consists in scanning eight or more suitably selected areas in the finger print with rotating line patterns which give rise to variations in the reflected light of such a nature that they can be translated electrically into numbers. Thus the final result is an arithmetical number consisting of eight or more digits, and this number is uniquely determined by the pattern of lines in the finger print.

Referring to Figure 1, which is a reproduction by pen and ink of an actual finger print, the delta is shown at 1, and the system of approximately circular and concentric arcs is shown at 2, 2.

Figure 2:
Figure 2 is a drawing of another finger print with the additional indication of a scanning light beam of a type used to locate a definite reference point in the print.

Figure 2 shows another finger print and shows at the delta a rotating light pattern, 3, which consists of three equally spaced linear beams radiating from a common center. This center is also the center of rotation. The paths of the linear beams as they rotate are shown by dotted lines. It should be noted that the widths of the linear beams are made about equal to the average width of the lines in the finger print. This scanning beam pattern is also shown in Figure 5.

Part of the light from this rotating light pattern, as reflected by the paper 19 or other support on which the finger print is imprinted, is received by the two photo-electric cells shown at 20, 21, in Figure 9. (It is not necessary to use two photo-electric cells. One cell only might be used, although this would involve some inefficiency in picking up light reflected from the farther side of the finger print. On the other hand, three or even more cells might be used.) These photo-electric cells are connected in parallel and are connected to the input of the amplifier shown in Figure 14.

Those skilled in the art of scanning and the generation of electrical impulses from the light variations resulting from scanning will recognize immediately that when this rotating pattern of three lines is projected on any part of the finger print, high frequency electrical waves will be generated in the photo-electric cell and amplifier, and that these waves will be modulated at a frequency which is three times the frequency of rotation of the pattern, as well as at other frequencies which do not concern us. They will also recognize that the modulation having three times the rotational frequency will have a sharp maximum when the center of rotation of the three-line pattern coincides with the center of the delta.

As a practical example, the frequency of rotation of the three-line scanning pattern might be 50 per second. In this case, the important modulation frequency in the output of the photo cells is 150 cycles per second.

While the three-line pattern rotates continuously, it is moved as a whole by the two mirrors shown at 17 and 18 in Figures 8 and 9 so that it scans the major portion of the finger print area in a finely spaced rectangular pattern. In so doing, it must at some time pass very close to the position in which the axis of rotation coincides with the center of the delta. At this instant, a sharp maximum of the 150 cycle output signal will occur.

It may happen that the finger print contains two deltas. In this case, there will be two maxima in the 150 cycle signal, but since the deltas are almost never of the same size, it is to be expected that one of the maxima will be greater than the other.

In order to avoid any ambiguity that might arise from the presence of two deltas, the sequencing switch shown in Figure 16 causes the motors 27 and 30 in Figure 8 to carry out the rectangular scanning operation twice. During the first complete rectangular scan, the electronic circuit shown in Figure 14 notes and then remembers the maximum 150 cycle voltage that is generated. When this voltage is received again during the second scan, the electronic circuit reacts, as will be explained in connection with Figure 14, to operate the clutches shown at 28 and 31 in Figure 8 so as instantly to disconnect the motors and to lock the mirrors in the positions in which the maximum signal is generated; that is, in the positions by which the center of rotation of the three line scanning pattern, which is the projected optical axis of the scanning system, is made to fall on the center of the delta of the finger print. The mirrors remain locked in this position during the rest of the scanning and identification cycle.

Figure 3:
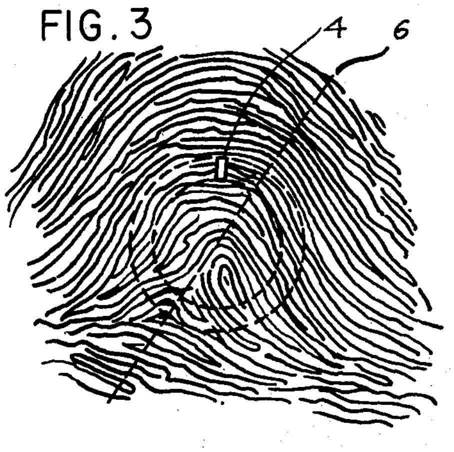
Figure 3 is a drawing of still another finger print with the additional indication of a second type of scanning light beam used to establish a rotational orientation about the reference point located by the use of the scanning light beam shown in Figure 2.

Referring to Figure 3, in which still another finger print pattern is shown, there is shown a single linear scanning beam, 4, placed radially with respect to a center about which it rotates in the path shown by the dotted lines. This scanning line pattern is also shown in Figure 6. The gear carrying the pattern is located in the second indexing position of the wheel 13 shown in Figures 8, 10, 11, and 12.

After the completion of the first phase of the scanning operation, the cycling switch shown in Figure 16 activates the motor 61 shown in Figure 13 long enough to index the target wheel into the second position. The scanning line 4 then falls on the finger print and, as will be recognized immediately by those skilled in the art, the light reflected from the finger print will generate, by means of the two photo-electric cells 20 and 21 and the amplifier shown in Figure 14, a complex electrical signal in which the higher frequencies are modulated at the frequency of rotation of the pattern. It will also be obvious to those skilled in the art that the percentage of this modulation will be a maximum when the center of rotation of the scanning line is in the position in which it is shown in Figure 3.

At the same time that the main sequencing switch causes the target wheel to be indexed into its second position, the motor 33 shown in Figure 8 is energized. By means of the cam 37 this causes the dove prism 15 in the optical system to rock slowly back and forth through an angle of approximately 50 degrees. This, as is well known, causes the image projected by the optical system to rotate back and forth around the projected optical axis through an angle of 100 degrees. This has the effect of sweeping the rotating scanning line 4 back and forth across the part of the finger print that is between the delta and the finger tip. When the pattern comes into the position in which it is shown in Figure 3, the 50 cycle output of the rectifier 79 shown in Figure 14 will be a maximum. The value of this maximum is noted and remembered as before. When the scanning pattern comes into this position a second time, the circuit responds, in this case, by disconnecting the motor 33 and locking the cam 37 which rotates the dove prism. The optical system is then locked in such a way that the projected optical axis is on the center of the delta in the finger print and the vertical line in the optical system which passes through the optical axis and through the center of rotation of the gear 43, as projected, coincides with the dotted straight line 6 shown in Figure 3, which passes through the center of the delta and through the center of the system of circular arcs in the lines near the print of the tip of the finger. Thus the finger print and the optical system have been placed in a perfectly definite and reproducible relation to each other.

Figure 4:
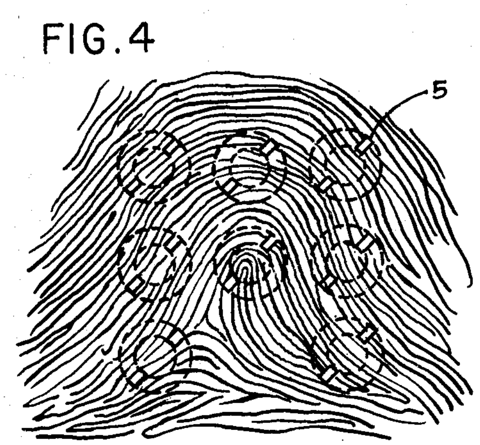
Figure 4 is a drawing of a fourth finger print with the additional indication of a pattern of eight scanning light beams of a third type which is used to obtain a numerical expression of the principal direction of the lines in the print in the area scanned by each light beam.

When this point has been reached, the sequencing switch shown in Figure 16 again energizes the motor 61 shown in Figure 13, thus causing it to index the wheel 13 into the first of the positions in which the rotating aperture has the form 5 shown in Figures 4 and 7. Those skilled in the art will recognize immediately that with this type of projected rotating light beam a complex wave will be generated, in which the higher frequencies will be modulated at a frequency of twice the frequency of rotation of the scanning beam.

At the same time that the scanning beam is changed, the commutating device shown in Figure 15 is connected into the electronic circuit. This device functions in a manner which will be explained in detail in connection with Figures 14, 15, and 16, to determine the position of the scanning lines when the maximum high frequency voltage is produced. This position, expressed as a number, is "read out" by the mechanism described in connection with the above figures. This gives one digit of the eight (or more) required to give a unique identification of the finger print.

After the first digit of the identifying number has been "read out" from the device of Figure 15, the motor 61 in Figure 13 is again energized so that the wheel 13 is indexed into a new position. This continues step by step until all eight positions in which the aperture patterns are of the type shown in Figure 7 have been employed, and all eight digits have been "read out." The sequencing switch then pauses until a new finger print is placed in position for scanning.

It is important to note that the success of this method of identification by scanning depends upon each and every print consisting of clean lines and spaces, of uniform weight. It is assumed that the prints to be studied will be made by an automatic method in which the finger tip is inked uniformly and then contacted very rapidly with controlled pressure by the paper or other medium on which the print is received. The mechanism for producing the finger prints in this way is not a part of the present invention, although it is obviously related to it.

Having described the basis of the method by which finger prints are identified according to this invention, I now proceed to describe in detail the apparatus by which this procedure is carried out.

Referring to Figures 8 and 9, light from an incandescent lamp, 10 passes through condensing lenses 11 and 12 and through one of the apertures in the wheel 13. This wheel, 13, is shown in detail in Figures 10, 11, and 12. The light then passes to an achromatic lens, 14, which has the aperture in wheel 13 at its principal focus, through a dove reflecting prism 15, and through a second achromatic lens 16. After emerging from lens 16, the light is reflected successively by two front surface mirrors, 17 and 18, and then comes to a focus on the finger print, 19. Part of the light reflecting from the finger print is received by the cathodes of the two photoelectric cells, 20 and 21.

Mirror 17 is pivoted so as to be rotatable through an angle of a few degrees about the axis 22 under the control of the cam 24, which may be rotated by the motor 27 acting through the magnetic clutch 28, the worm 26, and the worm gear 25. The clutch 28 is of the type which has two conditions of operation; in the one condition, it transmits the power from motor 27 to worm 26; in the other condition, motor 27 is disconnected and the shaft of worm 26 is locked rigidly against rotation.

Similarly mirror 18 is pivoted to be rotatable about the axis 23 under the control of cam 29, which is driven by motor 30 through magnetic clutch 31. Clutch 31 is of the same type as clutch 28.

When motors 27 and 30 are both running and the clutches 28 and 31 are in the condition to transmit power to the worm 26 and the cam 29 respectively, the finger print is scanned in a rectangular pattern by the image of the aperture in wheel 13. If the condition of clutch 28 and of clutch 31 is reversed, the image stands still in the position it had reached at the instant when the clutches were locked.

The cell in which the dove prism, 15, is mounted has attached to it a lever, 32, which is actuated by a motor, 33, transmitting its power through magnetic clutch 34, gears 35 and 36, and cam 37. When motor 33 is operated and clutch 34 is in the condition to transmit power, the dove prism is rocked back and forth through an angle of approximately 50 degrees. If the condition of clutch 34 is reversed, the dove prism is locked in whatever position it was in when the clutch was locked.

Clutches 28, 31, and 34 are controlled by the electronic system shown in Figure 14.

The construction of the wheel 13 is shown in Figures 10, 11, and 12. Two side walls (40 and 41 in Figure 11) are supported parallel to each other by the rim of the wheel. These walls are pierced with ten pairs of holes which serve as bearings for ten gears, one of which, 42, is of the type shown in Figure 5, one, 43, is of the type shown in Figure 6, and eight, 44 . . . 44, are of the type shown in Figure 7. Referring to Figure 12, which shows the wheel with wall 41 removed, a central gear 45, which may be driven by any suitable means such as motor 46, sprocket 47, chain 48 (shown dotted), and sprocket 49 (shown dotted), transmits rotary motion to the gears 42, 43, 44, in which the apertures are mounted, by means of the bridging gears 50, 51, 52, 53, 54, 55, 56, 57, 58, and 59.

Figure 10 contains ten dotted circles 60 . . . 60, which show the area illuminated by the condensers 11 and 12 in the optical system. In this figure and in Figure 12, the gears 44 which carry the apertures, 5, as shown also in Figure 7, are shown displaced by various amounts in various directions from the center of the illuminated area in order to illustrate how these gears 44 may be arranged to scan various areas of the finger print in a predetermined pattern, such as the pattern shown in Figure 4. It should be noted that the amounts of displacement of these gears are exaggerated in these drawings in order to make it clear that in any possible case there is no difficulty in transmitting the rotary motion to the gears 44.

Figure 13 shows a motor 61, gears 62 and 63, and the cam 64, driving pin 65, and star 66 of a conventional four-sided Geneva mechanism which drives wheel 13 in the scanning optical system of Figure 8 by means of the gears 67 and 68. When motor 61 is energized at intervals during the scanning operation, it advances wheel 13 from one aperture position to the next and then locks it in position during the period of dwell of the geneva, permitting the use in proper sequence of the aperture of the type 3, the aperture of the type 4, and the eight apertures of the type 5, shown in Figures 2, 3, 4, 5, 6, 7, 10, and 12.

It should be noted that while these drawings show eight apertures of the type 5, there is nothing to prevent the construction of wheels similar to wheel 13 but containing larger numbers of apertures of the type 5, provided the gearing associated with the indexing geneva shown in Figure 13 and the switching cams shown in Figure 16 are changed appropriately. This increase in the number of apertures of the type 5 may be desirable in case an extremely large population of finger prints have to be identified, so that a number of more than eight digits is required to avoid duplication.

Figure 14 shows the electronic system by which the signals, arising in the photo-electric cells 20, 21, as a result of the scanning process, are amplified and used to control the other equipment.

A single photo-electric cell is shown; this stands for cells 20 and 21 connected in parallel, or for any larger number of cells that might be used, since all would be connected in parallel.

Cells 20, 21, in parallel, are coupled to the input of a voltage amplifier, 70, by means of a conventional anode coupling resistor 69 or by any of the other known circuit arrangements.

The output of amplifier 70 is a complex wave consisting of frequencies mostly above 1000 cycles per second which are modulated at frequencies in the range from 50 to a few hundred cycles. This output is fed to the demodulator 71. The output of the demodulator, in turn, consists mainly of a frequency of 150 cycles per second when a scanning beam of the type 3 is employed; of a frequency of 50 cycles when a beam of the type 4 is in use, and of 100 cycles when the scanning beams of the type 5 are in use.

By means of the ganged switches 76 and 77, which are operated under the control of the main sequencing switch shown in Figure 16, the output of the demodulator 71 is fed through the 150 cycle band pass filter 72, the 50 cycle band pass filter 73, or the 100 cycle band pass filter 74 as is required by the type of scanning aperture in use.

Band pass filters 72, 73, and 74 need not have extremely narrow pass bands. It is sufficient for the purpose if each of them has a pass band not more than one octave wide centered on the nominal frequency.

The output of whichever band pass filter is in use is fed to the power amplifier 78, which has a peak output signal in the order of 100 to 300 volts.

The output signal from power amplifier 78 is applied to a diode rectifier 79 through which it charges a condenser, 81, to a voltage very nearly equal to the peak voltage in the output of the amplifier. This condenser cannot discharge except through its own leakage resistance and the leakage resistance of the associated parts.

When the first rectangular scan is carried out with the three-line pattern, 3, the switch 80, which short circuits the primary, 82, of a transformer, 83, is closed. At the point where the second rectangular scan begins, the main sequencing switch opens switch 80. During the first scan, the condenser 81 has been charged very nearly to the maximum peak 150 cycle voltage that was generated. By holding its charge this condenser, in effect, "remembers" the value of this peak voltage. During the second scan, no current will flow through the diode 79 until the scanning beam again reaches the position in which the maximum voltage was generated. When this occurs, a little current will begin to flow through the diode 79 and therefore through the transformer primary 82, since the condenser 81 can never have been charged to quite the full maximum voltage. How much current will flow through transformer primary 82 will depend on the constants of the circuit, which can be properly chosen by methods well known to those skilled in the art.

The flow of a little current through transformer primary 82 when the peak voltage is encountered the second time sends a pulse from the secondary of transformer 83 to the input of the flip-flop amplifier 84. This amplifier is so arranged that while the scanning operation is in progress it is supplying an output current from its output terminal A to engage the magnetic clutches 28 and 31 (shown in Figure 8) in the condition in which they transmit power from the motors 27 and 30. When flip-flop amplifier 84 receives the pulse from transformer 83 signaling that the peak voltage has occurred the second time, it changes to the condition in which its output is at output terminal B, but is connected to the windings in magnetic clutches 28 and 31 which disengage the drive from the motor and lock the clutches so as to hold the driven parts rigidly in the positions they were in at the instant when the reversing signal arrived. This locked condition is maintained until after the main sequencing switch has removed power from the motors 27 and 30 and actuated motor 61 to cause the wheel 13 to be indexed to the position in which the scanning pattern 4 shown in Figure 3 is in use. At this point, the main sequencing switch sends a signal through the lead 87 connected to the flip-flop amplifier 84 which restores amplifier 84 to the condition in which its output is on terminal A, and connects terminal A to clutch 34. At the same time, it closes switch 85 momentarily, discharging condenser 81 through resistor 86, and then opens switch 85, closes switch 80, moves the switches 76 and 77 to the positions in which the 50 cycle band pass filter, 73, is in the circuit, and then energizes motor 33 which moves the dove prism 15. The mirrors 17 and 18 which are used in the rectangular scanning process remain in the positions in which they were locked, since no motive power is reaching them. This means that the relation between the projected optical axis of the scanning optical system and the finger print remains the same as it was when the second maximum of 150 cycle voltage actuated the flip-flop amplifier, that is, the projected optical axis strikes the finger print at the center of the delta.

The second type of scanning operation now proceeds, in which the scanning beam 4 is swept across the part of the finger print in which the approximate arcs of concentric circles (marked 2, 2 in Figure 1) exist. When it reaches the position shown in Figure 3, in which the center of rotation is nearest to the center of the concentric arcs of circles, the high frequency output is a minimum while the light beam is travelling around the arcuate lines of the print and a maximum when the beam is 180 degrees away from the central portions of the arcs, since in this 180 degree position the beam is cutting perpendicularly across the nearly parallel and straight lines of this part of the print. Therefore, when the rotating scanning pattern is in this position on the print, the percentage of 50 cycle modulation of the photo cell output signal is a maximum. As before, this maximum signal charges the condenser 81 during the first sweep of the scanning pattern 4 across the print. When the second sweep starts, the main sequencing switch opens the switch 80, and when the maximum 50 cycle voltage occurs the second time, a pulse is transmitted as before to the flip-flop amplifier 84. This now transfers the output connected to the clutch 34 to its output B, which disconnects the drive from motor 33 and locks clutch 34 and therefore dove prism 15 in position. Clutch 34 remains locked until the main sequencing switch has removed power from motor 33. The main sequencing switch then energizes motor 61 long enough to index wheel 13 into the next position, restores the flop-flop amplifier to the A output condition by a signal delivered through lead 87, closes switch 85 momentarily, opens switch 85, closes switch 80, and moves the switches 76 and 77 to the positions in which the 100 cycle band pass filter, 74, is in the circuit.

It will be noted that when the 100 cycle band pass filter 74 is in the circuit, its output is transmitted to the power amplifier 78 through a commutating device 75. This device is shown in greater detail in Figure 15. In this figure is shown a motor 96, and a clutch 97, of the same construction as the motors and clutches 27 and 28, 30, and 31, and 33 and 34 shown in Figure 8. In this case, the motor and clutch cannot be shown separately in the figure because they are seen end-on. Figure 15 also shows gears 98, 99, 100, and 101, by which the motor drives a pair of brushes 102 and 103 slowly around the rotating commutator, 75, which has two narrow diametrically opposite contact areas 106 and 107 connected by slip rings (not shown) to the output of the band pass filter 74. The commutator, 75, is rotated in synchronism with the scanning patterns 5, either by direct mechanical connection or by synchro motors, except that a displacement must be made to take account of the phase angle introduced into the 100 cycle signal by the amplifiers and filter.

Figure 15 also shows, connected to the gear 101 which carries the brushes 102 and 103, a contact arm 104 which over part of its swing around its center of rotation is in a position to contact one of the ten contact points, 105, which have been numbered from 0 to 9 to indicate how the result obtained by this operation is given a numerical interpretation.

When the main sequencing switch has completed all the other preparations for the third scanning operation, as explained above, now using the first of the scanning beams of the type 5, it applies power to motor 96 and connects clutch 97 to the output of the flip-flop amplifier 84, which is in the A condition in which it causes the clutch 97 to transmit power from the motor.

Motor 96 now drives the gear 101 and with it the brushes 102 and 103 around the rotating commutator 75, and when it reaches the point at which the brushes 102 and 103 are receiving the peak value of the 100 cycle wave, the condenser 81 will be charged to the corresponding voltage. During the second revolution of gear 101, the main sequencing switch opens the switch 80 so that when the maximum voltage is received the second time, a pulse is transmitted to the flip-flop amplifier as before, and the gear system shown in Figure 15 is locked by the change of output from the A to the B condition.

One commutating device 75 of the type shown in Figure 15 is required for each of the positions on wheel 13 that uses the scanning aperture of the type 5; these are connected into the circuit one after another by the main sequencing switch. The leads and switches required to do this are of an obvious nature, being similar to switches 76 and 77 shown in Figure 14. They have been omited, and only one commutating device 75 has been shown in Figure 14 in order not to make the drawing unduly complicated.

The arrangement of the contact points 105 will be different for the different switches and must be worked out according to the particular area of the finger print scanned by the associated aperture gear 44 on wheel 13. In some cases the orientation of the finger print lines may vary from finger print to finger print over a range of an entire 180 degrees. In other cases, particularly near the finger tip, the range of variation in a large number of prints may be only a few degrees. The spacing of the contact points, therefore, will be close in some cases and wide in others, and the contact points 105 will be placed only over that part of the sweep of contact arm 104 within which maxima of the 100 cycle voltage will be encountered.

When the second maximum of the 100 cycle voltage has triggered the flip-flop amplifier and locked the commutating device 75, the main sequencing switch rapidly completes the circuits between the contact points 105, numbered 0 to 9, and an external counter or indicating device (which might, for example, be a row of neon lamps). The circuits are completed one at a time, in order. Only the one which is touched by contact arm 104 at the time the commutating device 75 is so locked will send a signal, thus "reading out" the result of the scanning of this individual area of the finger print in numerical form.

After each read-out, the main sequencing switch makes the circuit changes to prepare the equipment for another scan, advances the wheel 13 by one step, and starts the motor 96 of the proper one of the commutating devices. Thus the selected areas of the finger print are scanned one at a time by the eight (or more) light beams of the type 5, and the results in numerical form are "read out" one after another, until a final result in the form of an eight (or more) digit number is obtained.

It is obvious from the above that the main sequencing switch, although simple in basic construction, must be very complicated on account of the large number of circuit changes it must make in the correct order and with the correct timing during the entire process of identifying a finger print. Figure 16 shows the basic type of construction but does not attempt to show all the details of the switch that is actually required.

In Figure 16, a motor 110 drives, by means of a train of gears 111, 112, 113, 114, an assemblage of cams 115 which operate a series of switches 116, each switch being closed when a high part of the cam is under it, and open where the cam is low. This type of construction is well known, and it is obvious that by employing a sufficient number of cams and spacing their high and low regions in the proper sequence and at the proper distances, the construction can be made to execute circuit changes of almost any conceivable degree of complexity. The cams in this case should be designed so that all the circuit changes involved in the complete scanning and identification procedure as described above will be completed in one revolution of the cam.

I have described my invention in terms of a specific assemblage of apparatus, but it is not restricted to the details of this specific embodiment. Many well known equivalents exist for each of the functional elements described, and apparatus constructed by the use of such equivalents I regard as falling within the scope of my invention so long as the basic method of identification I have set forth is followed.

What I claim is:

1. An optical system for scanning finger prints and identifying them comprising an optical projector having a lens array including a dove prism, means for successively inserting into the optical projector one of a plurality of rotatable light patterns, means for displacing the projected light from a first light pattern of the plurality laterally relative to a finger print, means rotating the light pattern in the optical projector, photosensitive means receiving light reflected from the finger print being scanned, electric circuit means connected to the photosensitive means generating a pulse when the rotating first light pattern generates the maximum voltage response in the photosensitive means, means actuated by the pulse to lock the lateral displacing means in the position of maximum voltage response, means for rotating the dove prism back and forth in a limited angle about the optical axis of the projector, the dove prism rotating means being actuated with a second light pattern of the plurality differing from the first light pattern inserted in the projector, second pulse generating means which generate a pulse when the second light pattern generates a maximum voltage response in the photosensitive means, which pulse disconnects the dove prism rotating means in its position of maximum voltage response to maintain the dove prism in the particular rotated position, and a third pulse generating means for each of the other light patterns of the plurality generating a pulse when its cooperating light pattern is in the optical projector and rotated and the rotation generates a maximum response, the pulse from each third generating means being indicative of the contents of the particular finger print area being scanned and actuating the insertion means to position the next rotatable light pattern of the plurality in the projector.

2. The optical system according to claim 1 in which the first light pattern is in the form of three radial light slits of equal dimensions equally spaced from and about the axis of revolution, the second light pattern is a single radial slit, and each of the other light patterns of the plurality has a pair of diametrically aligned light slits of equal dimensions and equally spaced from the axis of revolution.

3. The optical system according to claim 1 in which the first light pattern is so positioned in the insertion means that on insertion into the projector its axis of revolution is coaxial with the optical axis of the projector, and each other light pattern of the plurality is so positioned that on insertion into the projector its axis of revolution is eccentric to the optical axis of projector, each eccentric position being somewhat different in accordance with a predetermined program.

4. An electro-optical system for scanning finger prints and identifying them, comprising an optical projector having a lens array including a dove prism, photosensitive means receiving light reflected from a finger print against which the projector light is directed, a rotatable target wheel rotatably supporting a plurality of at least three light pattern producing elements successively insertable into the projector, control means including a sequence switch and an amplifying electrical circuit, the circuit including a plurality of band pass filters of differing frequencies selectively connectable in the amplifying circuit, a commutator connected to the output side of each filter of one predetermined frequency of the differing frequencies, a memory circuit and a flip-flop amplifier connected to the output side of the amplifying circuit, a pair of oscillatable mirrors in the path of the projected light displacing it in mutually perpendicular directions relative to the finger print, first driving means for rotating the target wheel and each of the rotatable light pattern elements, second driving means for the oscillatable mirrors actuated by the control means on positioning the first of the plurality of the rotatable light pattern elements in the projector on insertion into the amplifying circuit of the filter of the frequency corresponding to the modulation frequency of the first light pattern until the circuit generates a first pulse when the rotating first light pattern element generates the maximum voltage response in the photosensitive means whereupon the control means deenergizes the second driving means to lock the oscillatable mirrors in the position they occupy on the occurrence of the first pulse, third driving means for rotating the dove prism back and fourth through a limited angle about the optical axis of the projector, the control means upon occurrence of the first pulse energizing the first driving means to rotate the target wheel sufficiently to replace the first light pattern element by the second light pattern element in the projector, to switch the filter corresponding to the modulation frequency of the second light pattern element into the circuit, and energizing the third driving means rotating the dove prism until the circuit generates a second pulse responsive to the second light pattern generating a maximum voltage response in the photosensitive means, the second pulse disconnecting the third driving means from the control means to leave the dove prism locked in the position it occupied on the occurrence of the second pulse, the control means now reenergizing the first driving means to a third light pattern into the projector and connecting the pass filter of the frequency corresponding to the modulation frequency of the third light pattern in the circuit, the last mentioned filter being connected at its output side to the commutator, fourth driving means rotating the commutator in synchronism with the rotation of the third light pattern element, a pair of diametrically opposite peripheral conductive regions on the commutator, fifth driving means including a terminal gear, a pair of diametrically spaced conductive brushes on the terminal gear adapted on rotation about the rotating commutator to engage the commutator conductive regions, a conductive contact arm on the terminal gear extending beyond the gear teeth, a series of individual identity contacts in one portion of the rotary path of the free end of the contact arm, the electrical circuit producing a third pulse when the rotating third light pattern element within the projector generates a maximum voltage response in the photoelectric means, which third pulse deenergizes both the fourth and the fifth driving means, means for testing each individual identity contact of the series actuated by the control means upon occurrence of the third pulse to identify the individual contact engaged by the contact arm, the control means so inserting each of the remaining third light pattern elements until the last of such elements has caused a third pulse, each third pulse being indicative of the contents of the finger print region scanned by the particular third light beam patterns and the plurality of the identity contacts of the series so identified by the test means for the successive third light pattern elements identifying the finger print scanned.

5. The electro-optical system according to claim 4 in which the number of the plurality of the light pattern elements is ten, the first element of the plurality is of the first light pattern having three equally dimensioned radial slits equally distanced from and about its axis of revolution, the second element of the plurality is of the second light pattern having a single radial slit, and the remaining elements of the plurality are of the third light pattern each having two equally dimensioned slits diametrically aligned and equally spaced from the axis of revolution.

6. The electro-optical system according to claim 5 in which each radial slit of each light pattern is of equal dimensions, the slit of the second light pattern is at a radius peripheral end region, and all light pattern elements are rotated at the same speed.

7. The electro-optical system according to claim 4 in which the wheel defines individual apertures through which the light pattern elements project, only the axis of the first light pattern is coaxial with the projector axis, the axes of the remaining light patterns being positioned eccentrically of the projector axis and at predetermined different regions about the projector axis, each light pattern element includes a gear about its cylindrical periphery, a gear train on the wheel of which individual gears mesh with one or more of the light pattern gears, and the first driving means includes two motors one of which drives the wheel per se and the other drives the gear train.

8. The electro-optical system according to claim 4 in which each mirror of the oscillatable pair is mounted on the free end of a lever, the levers being in alignment with each other with the axes about which they oscillate being perpendicular to each other, one mirror being at 45° to the optical axis in a first direction and the other being at 45° to the optical axis in the direction at right angles to the first direction, and the second driving means individual to each oscillatable mirror comprises an eccentric element rotatable in a slot defined by the mirror supporting lever, the eccentric element being mounted on a shaft driven by way of a magnetic clutch on energization of the clutch by an electric motor.

9. The method of identifying finger prints comprising impressing a finger print on a carrier, causing relative rotary motion between a beam of radiant energy projected along an axis perpendicular to the print to modulate at a first frequency the radiant frequency reflected from the carrier to locate a first point of the print at which maximum modulation of the radiant energy occurs, causing a print region including the first point to modulate the radiant energy at a second frequency incident on the print along a second axis parallel to the first axis to locate a second point of the print at which maximum modulation occurs at the second frequency, then causing each of a selected plurality of print regions other than those regions prior utilized for the first and second frequency modulations successively to modulate at a third frequency the radiant energy incident on the print regions of the plurality along axes parallel to the first and second axes, and recording the position of maximum response of each modulation at the third frequency by particular identifying signals.

References Cited in the file of this patent

UNITED STATES PATENTS

| | | |
|---|---|---|
| 1,818,003 | Myers | Aug. 11, 1931 |
| 1,926,597 | Naumann | Sept. 12, 1933 |
| 2,007,589 | Williams | July 9, 1935 |
| 2,048,879 | Moran | July 28, 1936 |
| 2,085,935 | Widenham | July 6, 1937 |
| 2,184,162 | Stockbarger et al. | Dec. 19, 1939 |
| 2,596,591 | Packard et al. | May 13, 1952 |
| 2,813,460 | Wallin | Nov. 19, 1957 |
| 2,873,381 | Lauroesch | Feb. 10, 1959 |